Dec. 30, 1924.

E. B. McCARTNEY

TRACTOR

Filed May 12, 1919

WITNESS
J. Jessen

INVENTOR
ELMER B. McCARTNEY
BY Paul & Paul
ATTORNEYS

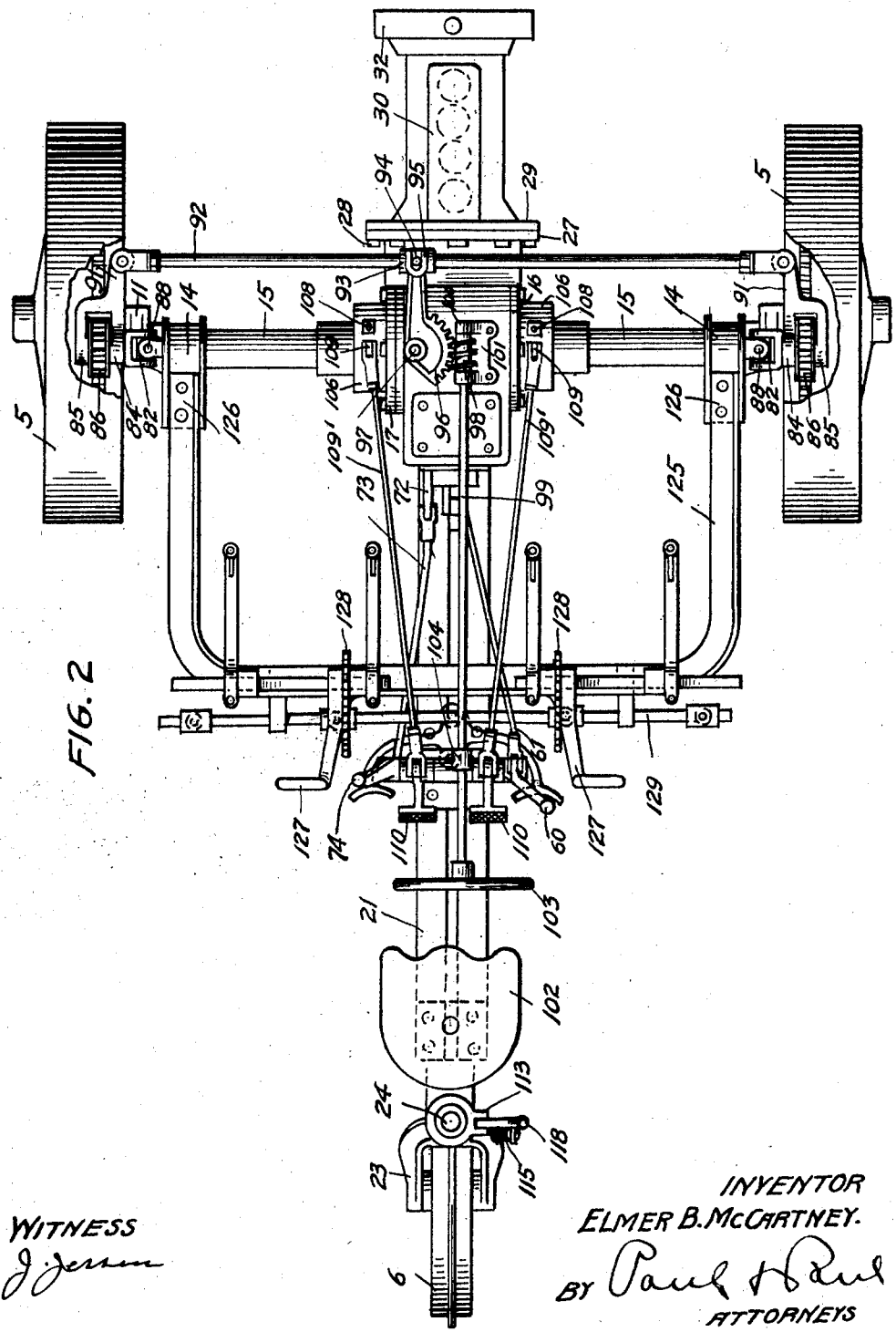

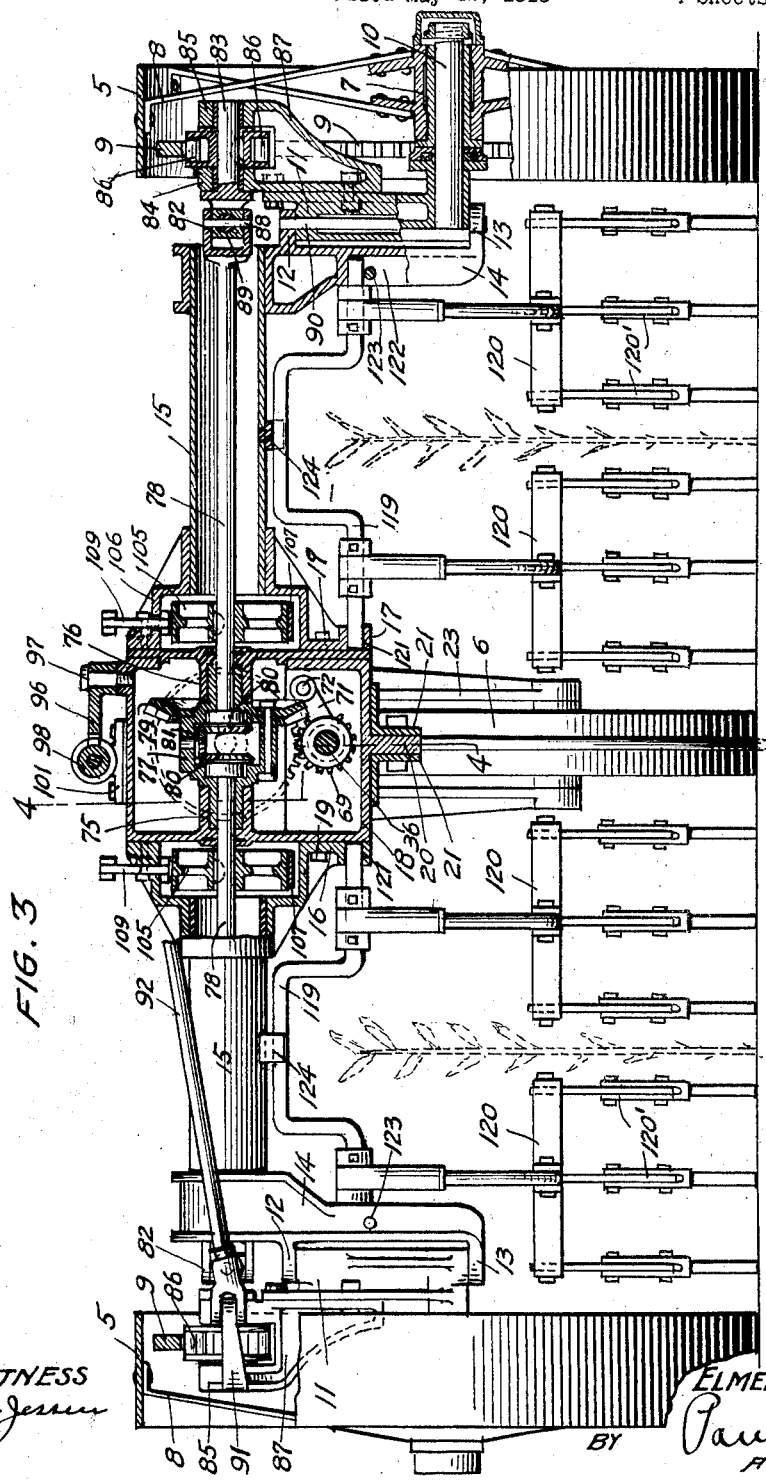

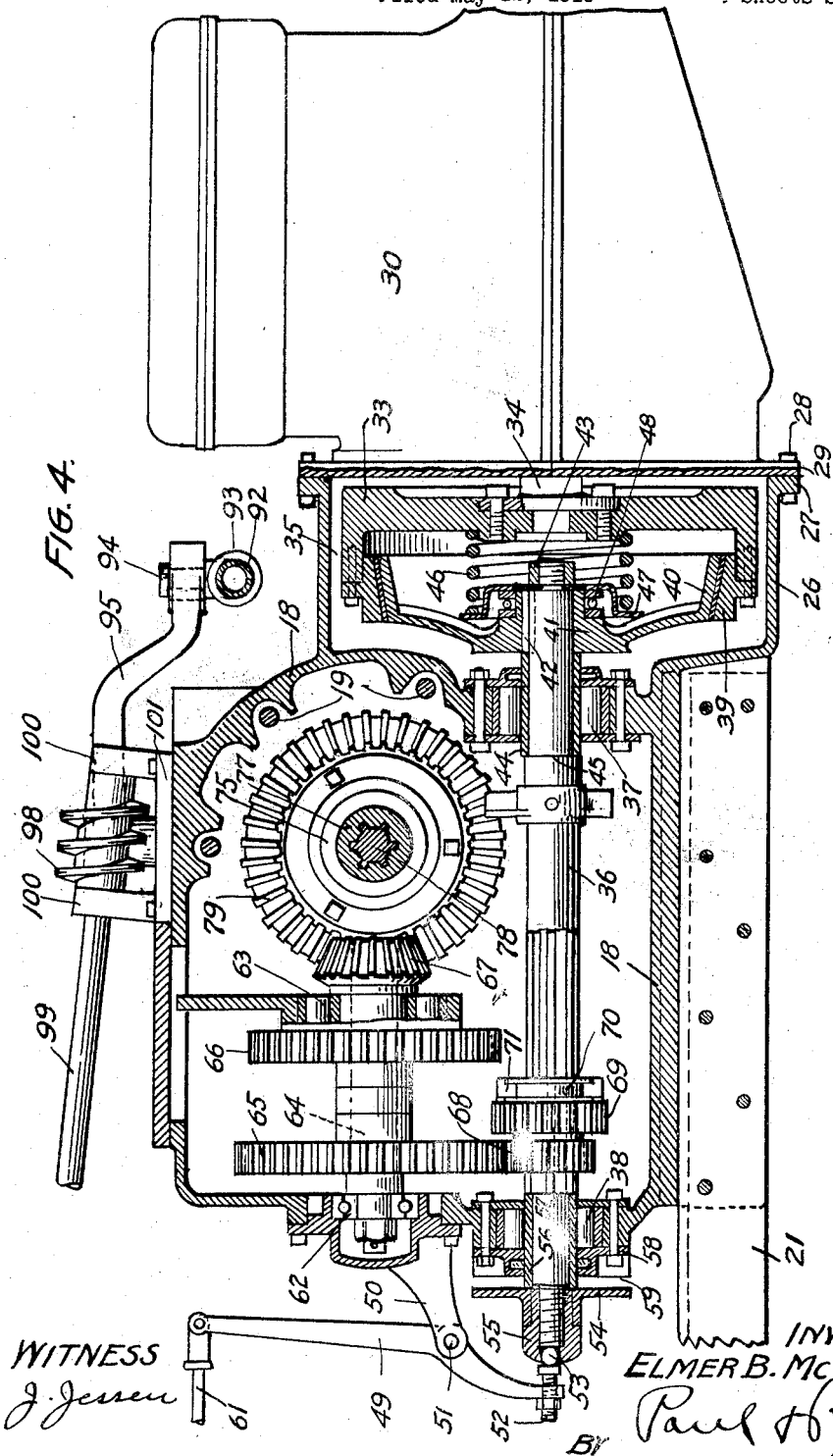

UNITED STATES PATENT OFFICE.

ELMER B. McCARTNEY, OF MINNEAPOLIS, MINNESOTA, ASSIGNOR TO TORO MOTOR COMPANY, OF MINNEAPOLIS, MINNESOTA, A CORPORATION OF MINNESOTA.

TRACTOR.

Application filed May 12, 1919. Serial No. 296,372.

*To all whom it may concern:*

Be it known that I, ELMER B. McCARTNEY, a citizen of the United States, and resident of Minneapolis, in the county of Hennepin and State of Minnesota, have invented certain new and useful Improvements in Tractors, of which the following is a specification.

My invention relates in general to tractors for propelling agricultural implements particularly of the cultivating type.

The object of the invention is to provide a light, simply constructed, efficient and easily controllable tractor, particularly suitable for the attachment of standard two-row cultivator parts and preferably having an internal combustion engine as its motive power.

Further particular objects are to provide means for easily and accurately steering the tractor and guiding the cultivator implements between the rows of growing corn, cotton or other row crops, and means for making short turns at the ends of the rows or at the field corners and similar places, while at the same time enabling the driver to conveniently and effectually watch the operation and guide the implement.

A further object is to mount the motive and heavier parts of the tractor at a low point for the purpose of giving the driver a clear view and for stabilizing the machine, and further, while effecting a low center of gravity, at the same time providing high ground clearance at the points where the tractor passes over the plant rows.

My invention consists in certain constructions and combinations as hereinafter described and more particularly pointed out in the claims, taken in connection with the accompanying drawings in which, Figure 1 is a side elevation of a tractor with a preferred cultivator attachment, and having one of its drive wheels removed.

Figure 2 is a plan view of the tractor partly in section showing the operating mechanism for the cultivator.

Figure 3 is a transverse sectional view on the line 3, 3, of Figure 1 on a larger scale.

Figure 4 is a longitudinal, vertical section through the transmission casing mainly on the line 4—4 of Figure 3.

*The supporting wheels and frame.*

Figure 1:
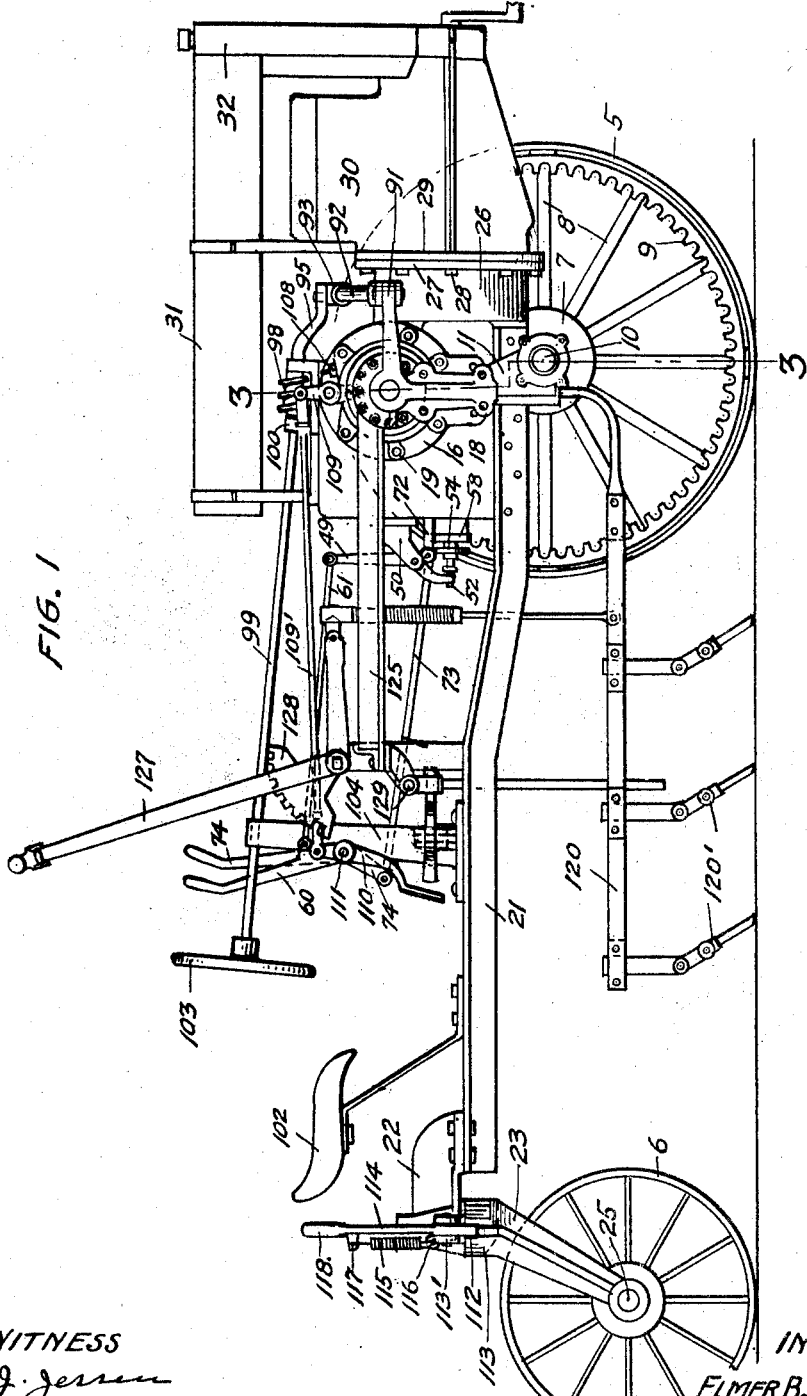

The tractor is preferably supported by two front drive wheels 20 and a trailer or caster wheel 6. The drive wheels are spaced to straddle the rows of plants, and the trailer wheel is arranged to run between the rows, as indicated in Figure 3. The wheels 5 are of any preferred construction, and are provided with hubs 7, spokes 8 and driving gears 9. Axle pins, or stub-axles 10, on which the wheel hubs 7 are journaled, are attached to the lower ends of steering knuckles 11, these knuckles being pivoted between projecting ears 12 and 13 of depending end frames or axle arms 14, which have their upper ends secured to the outer portion of horizontal tubular frame or axle members 15. The inner ends of the members 15 are secured to heads 16 and 17, mounted on the walls of the transmission casing 18. The heads 16 and 17 are preferably arranged in axial alinement on opposite sides of the casing, and are secured thereto by suitable means such as the bolts or screws 19. It will be seen that by this construction and arrangement the transmission casing 18, the tubes 15, and the depending arms 14, together form a transverse main frame with depending end frames, and that this frame forms the supporting axles for the drive wheels 5. It will also be seen that by the central location of the casing 18, and the elevated position of the tubular members 15, a high ground clearance is provided between the wheels 5 and the casing 18, and that the casing may occupy a low center of gravity position without interfering with the plant rows to be cultivated. The casing 18 preferably depends below the tubular members 15 and it is also preferably provided with a central rib 20 on its under side, to which is secured the rearwardly extending trailer bar 21, which, as here shown, is formed of angle bars. A bracket 22 is secured to the rear end of the bar 21, and to this bracket is pivoted the forked caster arm 23 by means of vertical pins 24. The trailer wheel 6 is journaled in suitable bearings on a pin 25 in the forked arm 23.

It will be noted that the front tubular axle members 15, transmission casing 18, and the trailer bars 21 comprise the only necessary supporting structures, and that the need for a separate frame is eliminated.

*The power transmission.*

The casing 18 is at the lower front end provided with a cylindrical extension 26 having an annular flange 27, to which is rigidly secured by means of suitable bolts 28, the flange 29 of the internal combustion engine 30. The engine may be of any suitable type, but it is preferably of the standard four cylinder vertical type, being supplied with fuel from a suitable fuel tank 31, and provided with a radiator 32. The engine forms no part of the invention and is not illustrated in detail, but its flywheel 33 being secured to the crank shaft 34 is arranged to rotate in the chamber 35 formed by the extension 26 of the transmission casing 18. A driving shaft 36 is mounted in line with the crank shaft 34 in suitable bearings 37 and 38, preferably of an anti-friction type and the location of this shaft in the casing 18 as well as the location of the engine may be any desired distance below the center line of the heads 16 and 17 and axle tubes 15. Any suitable clutch mechanism may be provided between the fly wheel 33 and the driving shaft 36, but I have illustrated a simple clutch consisting of the conical clutch ring 39 fastened to the fly-wheel 33, the internal clutch member 40 being secured to the shaft 36 by means of a hub 41, key 42, clamping nut 43, sleeve 44 and shoulder 45 on the shaft 36. A coil spring 46 bearing against the fly-wheel 33 and against a flange or disc 47 mounted on a suitable thrust bearing 48 tends to hold the clutch in engagement. To disengage the clutch the shaft 36 is moved laterally through the bearings 37 and 38, by means of the lever 49, pivoted to a bracket 50 at 51, and engaging, through an adjusting stud 52 and ball 53, the end of the shaft 36. A brake disc 54 is secured to the shaft 36 by means of a threaded nut 55, a sleeve 56 and a shoulder 57 on the shaft 36, and a dust ring 58 is provided with a brake face 59. The lever 49 is connected to a hand lever 60 by a rod 61 and when the driver pulls the hand lever the shaft 36 is first moved to force the clutch out of engagement and a further movement engages the brake disc 54 with the face 59 and checks the shaft.

Above the shaft 36, in suitable bearings 62 and 63, is mounted the countershaft 64, having spur gears 65 and 66, and bevel gear 67. Spur pinions 68 and 69 on the shaft 36 mesh with the gears 65 and 66 and are adapted to be moved laterally on the splined shaft 36, by means of the collar 70, arm 71, rods 72 and 73 and hand lever 74, to change the speed or reverse the tractor, the reversing gear not being shown in the drawings. Mounted in bearings 75 and 76 in the casing 18 and axially in alignment with the tubular axles 15 is the housing 77 for the differential shafts 78. A bevel gear 79, meshing with the bevel gear 67 on the countershaft 64 is secured to the housing and suitable bevel gears 80 and 81 are connected to the differential shafts 78 and housing 77 respectively and operate differentially in the usual way. The shafts 78 pass centrally through the tubes 15 and are connected, through universal couplings 82 to short driving shafts 83, mounted in bearings 84 and 85 said shafts being provided with pinions 86, preferably of the roller type, and meshing with the integral gears 9 of the drive wheels 5. The bearings 84 and 85 are arranged in brackets 87 rigidly secured to the steeering knuckles 11, and both the pins 88 and 89 of the universal coupling 82 are axially in line with the vertical pivot pin 90 of the steering knuckles 11. This construction permits of the turning of the drive wheels in either direction for steering the tractor without in the least interfering with the power transmission to the wheels, as the short driving shafts 83 turn laterally around the same center as the knuckles and wheels and the universal couplings compensate for the angularity of the shafts 83 and the differential shaft 78. The power from the engine is transmitted through the shafts and gearing heretofore described, to the differential shafts 78, and through the universal coupling 82 to the short shafts 83, the said shafts finally transmitting the power through the roller pinions 86 to the bull gears 9 and drive wheels 5.

*The steering and controlling mechanism.*

The brackets 87, secured to the steering knuckles 11, are provided with forwardly projecting steering arms 91 having a pivoted connecting rod 92. A collar 93, having a pin 94, is secured to the rod 92 about midway between the wheels 5 and a slotted arm 95, projecting from a worm gear segment 96 engages the pin 94. The gear segment 96 is journaled on a stud 97 on top of the transmission casing 18 and is engaged by a worm 98 mounted on the steering rod 99 between bearing lugs 100 of a bracket 101. The steering rod 99 extends backward to near the driver's seat 102, where it is provided with a handwheel 103 and supported in a bearing standard 104, that is secured to the trailer bars 21. By operating the hand wheel it will be evident that through the mechanism described the drive wheels may be turned in either direction or held in a straight position to steer the tractor accurately between the plant rows. Additional means are provided for turning the tractor quickly on a very short radius. To this end brake pulleys 105 are mounted on the differential shafts 78 within a housing 106, comprised in the heads 16 and 17. Brake bands 107, connected to the heads at 108, surround the pulleys 105 and are attached to brake arms or levers 109. Rods 109' connect the levers 109 to foot levers 110, pivoted at 111 to the standard 104. When it is desired to turn the tractor short, one or the other of the brake bands 107 is tightened around the pulleys by means of pressure on one of the foot levers 110. The corresponding differential shaft and drive wheel will be slowed up or stopped according to the pressure exerted by the driver on the foot lever and the tractor will swing around quickly and easily, the rear trailer wheel castering laterally around its pivot. I prefer to provide means for locking the caster wheel 6 against lateral movement when operating the tractor in straight row crop fields and releasing it for free movement at the ends of the rows. For this purpose a slot 112 is provided in the hub 113 of the caster arm 23. Lugs 113' project from the bracket 22, between which a lever 114 is pivoted above the slot 112 having its lower end engaged in the slot when it is desired to lock the caster wheel. A coil spring 115 connected to the bracket 22 at 116 and to the upper part of the lever 114 at 117 tends to hold the lever in the slot. When it is desired to unlock the wheel the handle 118 of the lever is thrown backward, throwing the lower locking end forward out of the slot, and the spring is arranged to hold the lever in both forward and backward position. When it again is desired to lock the wheel the lever is thrown forward, and the lower end of the lever will automatically enter the slot and lock the wheel as soon as the machine assumes a straight course.

*The cultivator attachment and control.*

The bails 119 and cultivator frames 120 having cultivators 120' are detached from the tongue and wheels of the ordinary cultivator and the bails are attached at their inner ends to the heads 16 and 17 of the transmission casing by being inserted in sockets or holes 121, and are connected at their other ends to the depending axle arms 14 in slots 122. Supporting pins 123 are inserted in the arms 14 below the bails after they are in place. Clips 124 secured to the axle tubes 15 hold the bails in an elevated position just below the tubes. A yoked frame 125, preferably the frame of the cultivator is attached to the axle arms 14 at 126 and carries the usual operating levers 127, quadrants 128 and sliding implement adjusting bar 129. All the adjusting and controlling levers are arranged to come in close and convenient proximity to the driver, but as this arrangement forms no part of the present invention it will not be further described in detail.

It is evident that various changes and modifications might be made in the construction without departing from the principle and scope of the invention and I do not, therefore, wish to confine myself strictly to the construction disclosed.

I claim as my invention:

1. A tractor comprising a transverse main frame, having depending end frames upon which, and below the main frame, driving wheels are mounted, driving gears on the wheels a casing, centrally between said end frames, drive shafts mounted on the main frame for transmitting power to the driving gears on the drive wheels, a power plant and a primary power shaft mounted in said casing in a plane below said drive shafts, and power transmitting means from said power shaft to said drive shafts.

2. A tractor comprising a main transverse frame, having depending end frames upon which, and below the main frame, driving wheels are mounted, driving gears on the wheels a casing depending from said frame centrally between said end frames, a differential in said casing, transverse drive shafts mounted in said main frame for transmitting power from said differential to said gears on the drive wheels, a primary power shaft mounted in said casing in a plane below said differential and said drive shafts, and power transmitting means from said power shaft to said differential and drive shafts.

3. A tractor comprising a transverse main frame having depending end frames upon which, below the main frame, driving wheels are mounted, driving gears on the wheels a casing, centrally located between said end frames, horizontal drive shafts journaled on the main frame, horizontal counter shafts journaled on the end frames having driving connections to the driving wheels, universal joints between said drive shafts and said counter shafts, a power plant and a primary power shaft mounted in said casing, power transmitting means from said power shaft to said drive shafts and means for steering said drive wheels.

4. A tractor including an engine, a transmission casing attached to the engine, front drive wheels having drive gears thereon, stub axles upon which said wheels are mounted, casings extending from either side of the transmission casing and attached to the same to form a main supporting frame for the tractor, axle arms depending from said side casings, power shafts in said side casings, steering knuckles pivoted on said axle arms, and means for operating same, and pinions carried by the power shafts and meshing with said drive gears on said wheels.

5. A tractor including an engine, a transmission casing attached thereto and having side casings attached to either side thereof, said side casings having depending arms, front drive wheels having drive gears thereon, stub axles upon which said wheels are mounted pivoted on said arms, drive shafts journaled in the transmission casing and extending through the side casings, steering means connected to said axles, a power shaft in said transmission casing, power shafts in said side casings, and pinions meshing with said drive gears on said wheels and in turn driven from said power shaft.

6. A tractor comprising an engine, a transmission casing attached to said engine and having side casings, said casings together constituting a transverse main frame, depending end frames upon which and below said main frame driving wheels are mounted, bails having their lower ends connected to the depending end frames and with the upper portions of the bails connected to said main transverse frames, said bails being adapted to have implements connected to their lower portions, drive shafts journaled in the main frame for transmitting power to the drive wheels, a power shaft mounted in said transmission casing in a plane below said drive shafts, and power transmission means from said power shaft to said drive shaft.

7. A tractor comprising an engine, a transmission casing attached thereto, side casings attached to the transmission casing, said casings forming a transverse main frame, depending end frames upon which and below the main frame internally geared driving wheels are mounted, horizontal drive shafts having universal couplings therein and journaled at one end in the transmission casing and having driving connections to the internal gears of the drive wheels, power transmitting means from said engine to said drive shafts within the transmission casing, and means for steering said drive wheels.

In witness whereof, I have hereunto set my hand this 5th day of May, 1919.

ELMER B. McCARTNEY.